UNITED STATES PATENT OFFICE.

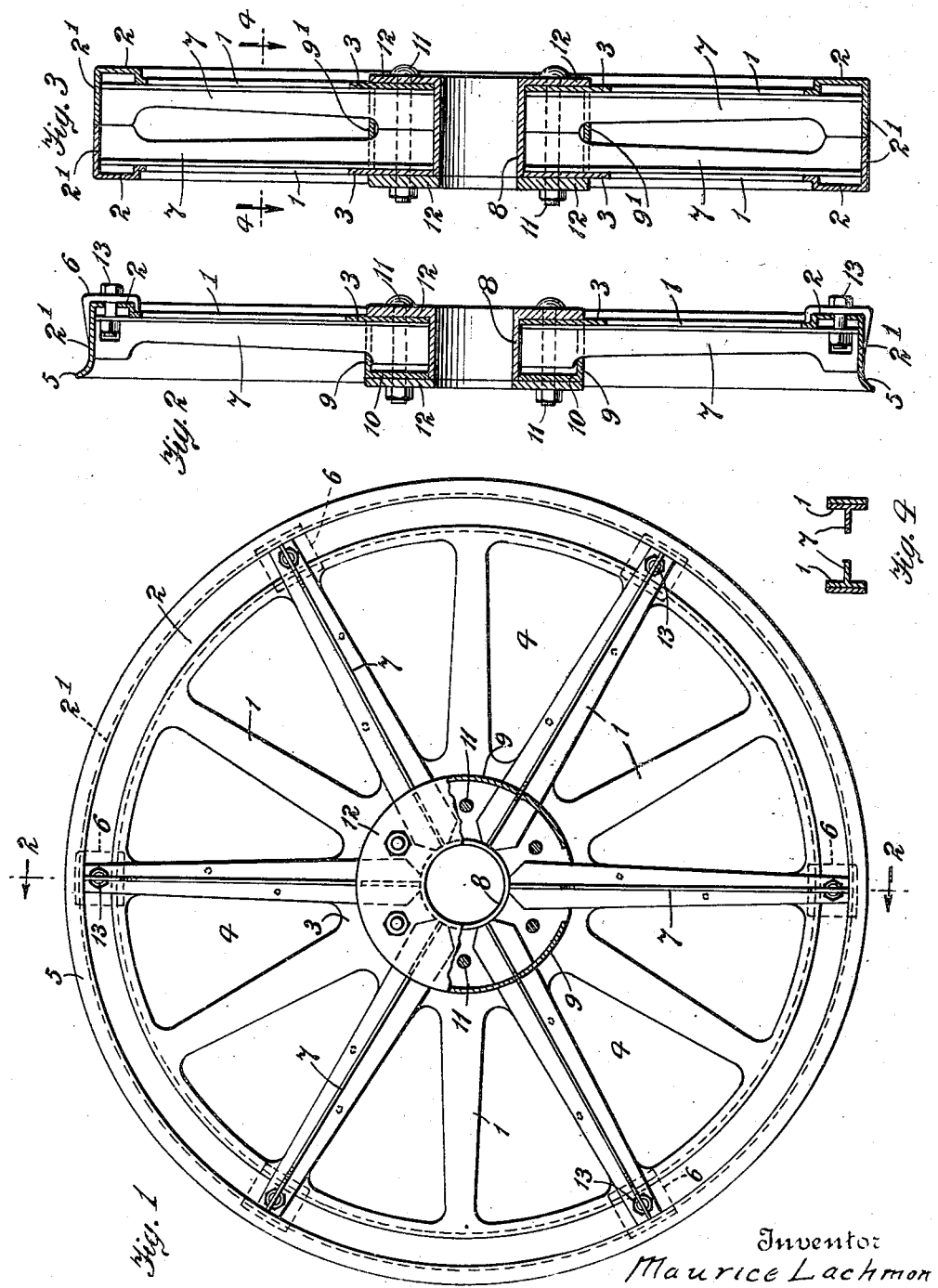

MAURICE LACHMAN, OF NEW YORK, N. Y., ASSIGNOR TO BETHLEHEM STEEL COMPANY, OF BETHLEHEM, PENNSYLVANIA, A CORPORATION OF PENNSYLVANIA.

METAL WHEEL.

1,420,432.   Specification of Letters Patent.   Patented June 20, 1922.

Application filed April 30, 1921. Serial No. 465,668.

*To all whom it may concern:*

Be it known that I, MAURICE LACHMAN, a citizen of the United States, and a resident of New York, in the county of New York and State of New York, have invented certain new and useful Improvements in Metal Wheels, of which the following is a specification.

My invention relates to the construction of metal vehicle wheels and more particularly to that class of wheels in which a rim, hub and spoke part are integral with one another being made from a single sheet or plate of metal and in which bar iron is utilized as a component part of the spokes.

The object of my invention is to produce a wheel of great strength and rigidity and of pleasing appearance utilizing in the spoke part iron T bars in the manner hereinafter more particularly described to secure the desired results of cheapness, strength and good appearance.

To these ends my invention consists in the construction of wheel hereinafter more particularly described in connection with the accompanying drawings and then specified in the claims.

Fig. 1 is a rear elevation of a wheel embodying my invention.

Fig. 2 is a vertical cross-section of the same on the line 2—2 Fig. 1.

Fig. 3 illustrates in vertical cross-section the preferred construction of wheel embodying my invention and designed to give maximum strength.

Fig. 4 is a section on line 4—4 of Fig. 3.

1 indicates the spoke parts, 2 the continuous rim part and 3 the continuous hub part of a sheet metal plate or disk cut to the desired form and preferably to produce separate spoke parts with the intervening spaces 4 to give the effect of a wheel having separate spokes. The rim portion 2 may be turned over or flanged as indicated at 2′ to form the seat for a detachable rim in which case it is desirable to extend the extreme edge 5 upwardly to form a stop. The rim part 2, when the wheel is intended for use with a detachable rim, is also formed with a circumferential groove at its circumferential edge which gives additional strength against torsional strains at this point and further provides an offset for engagement by the removable lugs or clips 6, whereby the detachable rim is secured in place.

7 indicates T-shaped bars disposed as the spokes of the structure and having the heads of the T bars engaged with the rear face of the spokes or spoke portion 1 and reinforcing the same. The stems of the T's are disposed transversely to the general plane of the wheel to give stiffness and the tops of the heads lie flat against the inside of the portion 1 of the disk or plate and are preferably fastened thereto by spot welding or other device. Preferably the T bars are cut away between the rim and hub ends thereof to lighten the structure. The bars 7 at their hub ends are assembled within the hub box and rest, preferably as indicated, upon the hub barrel and the stems of the T's are received in slots in the horizontal flanged portion 9 of a hub shell, the vertical portion 10 of which surrounds and is carried by the hub barrel 8.

In the drawings every other spoke part 1 is shown backed by a T bar but obviously a greater or less number of the latter might be used.

The parts are suitably fastened together in a hub structure by means of the bolts 11 which clamp the hub flanges 12 against the portion 10 of the hub shell on the one side and against the hub portion 3 of the metallic plate or disk on the other, as clearly shown in Fig. 2. These bolts are disposed preferably, as shown, in the spaces between the inner ends of the spokes 7. At the rim the clips 6 may be detachably secured by bolts 13 having hexagonal or other angular nuts at their inner ends fixed against turning in slots in the web or stem 7 of the T bar.

Obviously and in accordance with practice one of the flanges 12 may be integral with the hub barrel 8 in the form of my invention preferred for strength and as illustrated in Fig. 3. Two sets of T bars 7 are employed each backing or secured to its own spoke 3 of the disk or plate by its head, the two sets being disposed to either side of the central plane of the wheel and being suitably anchored by their stems in the shell 9′ which is slotted inwardly from its opposite edges respectively toward the center to receive the stems of the T bars. The edges of the stems engage or abut in the rim and hub as indicated and the parts are all fastened together by means of the bolts disposed, as before stated, and clamping the hub parts of the stems.

Obviously the compound rim formed by the flanged edges of the plates which engage one another by the edges of the flanges, as shown in Fig. 3, may be furnished with a supplemental detachable rim if desired.

It will be observed that the rim of the wheel will have great rigidity owing to the presence of the groove or offset in each half and to the engagement of the T bars directly with one another. It would be within my invention, however, to dispose the spoke parts of each half so that they would alternate with one another circumferentially of the wheel.

What I claim as my invention is:—

1. A metal wheel consisting of two sets of radially disposed T-bars forming spokes of the wheel, each set backing by its head one of a pair of sheet metal plates formed and cut to constitute the rim, hub and spoke parts integral with one another and means for securing the two sets together with the edges of the T-bars engaged.

2. A metal wheel having rim, spoke and hub parts integral with one another and formed of sheet metal combined with a spoke portion consisting of radially disposed T-bars, the heads of the T's being engaged by their outer faces with an inner face of the spoke portion of said plate.

3. In a metal wheel, the combination with a sheet metal plate cut or formed to constitute a continuous rim, a continuous hub part and separate spoke parts all integral with one another and radially disposed T-bars the heads of which engage the spoke portions of said plate while the stems of the T's are disposed transversely to the plane of the wheel.

4. In a metal wheel, the combination with a metal plate or disk cut and formed to provide a continuous rim part, a continuous hub part and separate spoke portions, radially disposed T-bars the heads of which coincide with and back the said spokes, a hub shell slotted horizontally to receive the stems of the T's and means for fastening the parts together in the hub by the hub flanges.

5. In a metal wheel, the combination of a sheet metal plate constituting hub, spoke and rim parts of the wheel integral with one another, said rim part having a circumferential groove at its circumferential edge, T-bars having the heads of the T's disposed against the inner faces of said plates and with the stems of the T's transverse to the plane of the wheel and means for clamping said bars and plate together in the hub.

Signed at New York, in the county of New York and State of New York this 28th day of April, A. D. 1921.

MAURICE LACHMAN.